United States Patent [19]

deJong

[11] 4,203,868
[45] May 20, 1980

[54] PROCESS FOR PREPARING CARBON WHICH ADSORBS METAL IONS

[75] Inventor: Geert J. deJong, Boekelo, Netherlands

[73] Assignee: Akzo N.V., Arnhem, Netherlands

[21] Appl. No.: 915,242

[22] Filed: Jun. 13, 1978

[30] Foreign Application Priority Data

Jun. 22, 1977 [NL] Netherlands ................. 7706879

[51] Int. Cl.$^2$ ............... B01J 27/02; B01J 31/02
[52] U.S. Cl. .................... 252/439; 252/436; 252/428
[58] Field of Search .............. 252/436, 428, 439

[56] References Cited

U.S. PATENT DOCUMENTS

| 1,768,803 | 7/1930 | Strosackel et al. | 423/444 |
|---|---|---|---|
| 1,992,832 | 2/1935 | Mootz | 423/444 |
| 2,232,909 | 2/1941 | Gohr | 252/439 X |
| 2,652,344 | 9/1953 | Simms | 252/439 X |
| 3,366,577 | 1/1968 | Miglietta | 252/439 X |
| 3,404,961 | 10/1968 | Rupp et al. | 423/444 |
| 4,081,401 | 3/1978 | Tokepani et al. | 252/428 |

FOREIGN PATENT DOCUMENTS 6805305 10/1969 Netherlands .
7210632 2/1974 Netherlands .

Primary Examiner—Delbert E. Gantz
Assistant Examiner—William G. Wright
Attorney, Agent, or Firm—Stevens, Davis, Miller & Mosher

[57] ABSTRACT

Particles of carbon which are capable of adsorbing metal ions are prepared by a process wherein a material containing carbon such as rubber, coal or the like is heated while mixed with a material containing sulfur to convert the carbon containing material into carbon particles and the carbon particles are treated with an aqueous solution containing an alkali metal hydroxide.

6 Claims, No Drawings

PROCESS FOR PREPARING CARBON WHICH ADSORBS METAL IONS

This invention relates to a process for the preparation of a solid carbon-containing material having a sorption capacity for metal ions.

A process for the preparation of a solid carbon-containing material having a sorption capacity for metal ions is disclosed in Netherlands Patent Application No. 6 805 305. In accordance with the disclosed process polymers of vinyl aromatic hydrocarbons are reacted with a compound made up of sulphur and chlorine in the presence of a catalyst and the resulting polymer sulphides or polymer polysulphides are oxidized or reduced. Reduction results in the formation of thiol resins which have a high affinity for ions of heavy metals. One disadvantage to the known metal absorbing material is its high price. This is due both to the high price of the starting materials and the relatively complex process required for the preparation of the desired thiol resins. The process is particularly costly when the material is one which cannot be regenerated after it has lost its sorption property.

It is therefore an object of this invention to provide a process for making an improved carbon-containing substance having a sorption capacity for metal ions. Another object of the invention is to provide a relatively inexpensive but efficient carbon-containing material having a sorption capacity for metal ions.

Surprisingly, it has now been found that a solid carbon-containing material having a sorption capacity for metal ions can be obtained in an inexpensive and simple manner by mixing a carbon-containing starting material with sulphur, heating the mixture at a temperature of about 120°–500° C., and subsequently treating it with an aqueous solution of alkali metal hydroxide at a temperature not exceeding about 200° C. Accordingly, the foregoing objects and others are accomplished in accordance with this invention by providing a process for making a solid material which contains carbon and adsorbs metal ions wherein a material containing carbon or a carbon compound is mixed with a material containing sulfur, the mixture is heated to convert the carbon-containing material into carbon and the resulting product is mixed with an aqueous solution containing an alkali metal hydroxide at a temperature of about 200° C. or less. The mixture of carbon-containing material and sulfur containing material is heated at about 120° C. to about 500° C. until the carbon source material is converted into granular carbon.

It should be added that the treatment with sulphur of a carbon-containing starting material, viz. a synthetic rubber and/or natural rubber, in order to obtain an active carbon is disclosed in Netherlands Patent Application No. 7 210 632. Besides sulphur, however, a great many inorganic and organic compounds are disclosed, the use of which is apparently preferred since no example is given in which sulphur is employed. After pyrolysis the resulting active carbon can be further activated by burning the carbon. Both from the way in which further activation takes place and from the disclosed uses of the material, such as the treatment of water, sugar juices, etc., it further appears that adsorption by the disclosed active carbon is mainly physical adsorption.

Any suitable carbon-containing source material may be used in practicing this invention. Examples of suitable materials are waste materials such as waste rubber, peat, lignite, coal, asphalt and petroleum coke. They are preferably used in a finely divided state, in the form of, for instance, chips or grains having a diameter of not more than a few millimeters. The rubber to be used may be of synthetic or natural origin. It will generally occur in the form of scrap automobile or other motor vehicle tires and in the form of worn objects that are partly or entirely made of rubber, such as conveyor belts. The rubber objects may be cut up or ground in any convenient manner, possibly after removal of metal parts, for instance, the wires from the beads of automobile tires. The process according to the invention is usually carried out in such a way that before, during or after the carbon-containing starting material is cut up, it is mixed with 0.1 to 5 parts by weight of sulphur and subsequently heated for a number of hours in an oven at a temperature in the range of about 120° to 500° C. Preference, however, is given to treatment with 0.5 to 1.5 parts by weight of sulphur per part by weight of starting carbon-containing material at a temperature between about 200° and 300° C.

The subsequent treatment of the sulphurized material with an aqueous solution of an alkali metal hydroxide may be carried out suitably at a temperature not exceeding about 200° C. Above 100° C. the treatment is usually done in an autoclave. It is preferred to use an aqueous sodium hydroxide solution, for instance, a 10% NaOH aqueous solution, by which with proper stirring the treatment can be completed within a few hours at a temperature of 80° C. or higher.

It has also been found that in the treatment of the product obtained by heating the mixture of carbon and sulfur source materials with an aqueous sodium hydroxide solution, the formation of thiol groups can be even further increased by including in the sodium hydroxide solution a dissolved alkali metal sulphide. Depending upon the amount of sulphur mixed with the carbon source material, sufficient sulphide solution may be formed in situ, so that the sodium hydroxide solution used may also, with advantage, be employed for treating a fresh batch. In many cases, however, it is advisable, that the sulphide should be dissolved in the aqueous sodium hydroxide solution beforehand, for instance, 10% $Na_2S$ in a 10% NaOH solution.

The material successively treated with sulphur and an aqueous solution of sodium hydroxide is finally filtered and/or washed with (acidified) water, after which it is ready for use.

The physical appearance of the novel adsorbing materials provided by the invention may vary from gel form to porous solid matter. For example, the material obtained by treating cut up automobile tires at a temperature between 180° and 280° C. has a gel-like structure. Treatment of the same starting material at a temperature above 400° C. results in obtaining a material having a porous structure.

The material produced with the process according to the invention not only shows the property of a cation exchanger, but is also capable of binding metals that occur in the form of anionic complexes.

Moreover, the material provided by the invention appears to have a high reducing capacity, which is particularly manifest in the sorption of ions of noble metals, such as gold and silver, and of metals of the platinum group. It is also found possible for instance to reduce $CrO_4^{--}$ to $Cr^{+++}$. This means that the novel material according to the invention can also be looked upon as an inexpensive chemical reducing agent. Another useful application of the material provided by the invention is for the removal of mercury from concentrated sulphuric acid, as obtained by roasting zinc sulphide.

One passage through a bed of such material of 96% sulphuric acid containing, for example, 5 ppm mercury may cause the mercury content to be reduced to below 0.1 ppm.

The adsorbed mercury remaining on the sorbent after the sulphuric acid has been displaced by dilute acid and finally by water can be isolated from it, if desired, by dry distillation.

It has further been found that the practical applicability of the material prepared by the process provided by the invention can still be considerably improved upon.

To that end the invention also provides a process in which prior or subsequent to thermal treatment the starting carbon source material is subjected to a treatment with sulphur or oleum, or still heated in the presence of air or some other oxygen-containing gas.

By this additional treatment there are introduced a small number of more or less polar groups such as sulphonic acid groups and/or carboxyl groups, which promote the swelling of the material in water. In practice, the treatment with sulphuric acid will as a rule be carried out by soaking 1 part by weight of the material to be treated in 1 to 4 parts by weight of 96% by weight $H_2SO_4$. Upon completion of the reaction the material is centrifuged and washed with water. It is preferred that the treatment with air should take place in a fluid bed. The present invention will be further described in the following examples. These examples are, of course, only meant to illustrate and not to limit the invention.

EXAMPLE I

Old automobile tires are cut into rubber chips measuring 1 to 2 mm. About 100 parts by weight of these chips are mixed with about 120 parts by weight of sublimed sulphur. The resulting mixture is subsequently heated in a rotating steel oven for eight hours at a temperature of 230° C. Next, the temperature is increased to 280° C., over a period of 8 hours. About 130 parts by weight of hard grains are obtained.

One-half of the resulting material, while in the fluidized state, is subsequently heated in air at 350° C. over a period of 6 hours and thereafter stirred for 4 hours at 90° C. in an aqueous solution containing 10% NaOH and 10% $Na_2S$. The chips are separated from the liquid phase by filtering and washed with water. After the material has been acidified with a solution of 5% by weight $H_2SO_4$ and washed with water, a product IA is obtained whose ion exchanging properties are given in Example VI and Example IX. The other half of the material, instead of being heated in air, is heated for 4 hours at 90° C. with stirring in the presence per part by weight of granules of 3 parts by weight of concentrated (96% by weight) sulphuric acid. After the acid has been washed out with water, the same treatment is carried out as described above for the first batch of chips. The ion exchanging properties of this product IB are given in Example VII and Example IX.

EXAMPLE II

Brown coal briquettes are crushed and ground into grains measuring 1 to 2 mm.

After drying in an oven at 105° C., about 100 parts by weight of the grains made up of brown coal and pitch are mixed with 50 parts by weight of sulphur and introduced into a rotating steel oven whose temperature is raised to 350° C. over a period of 4 hours. About 90 parts by weight of hard grains are obtained and are heated for 2 hours at 90° C. in an aqueous solution containing 10% by weight of NaOH. The grains, which are greatly swollen in the aqueous NaOH solution, are successively washed with water and acidified with dilute sulphuric acid (5% by weight of $H_2SO_4$). After they have again been washed with water, their properties are determined. The results are given in Example VIII and Example IX.

EXAMPLE III 100 parts by weight of coal grains (containing 24% volatile material) measuring 1 to 2 mm are mixed with 100 parts by weight of sulphur and subsequently heated for 8 hours in a rotating steel oven, with the temperature being gradually raised from 120° C. to 300° C. After cooling the yield of sulphurized coal grains is 115 parts by weight. The grains are then treated in an autoclave for 4 hours at 180° C. with an aqueous solution containing 10% NaOH and 10% $Na_2S$. The resulting material is acidified, washed and sieved to retain a particle size of 0.5 to 1.5 mm. The results are given in Example IX.

EXAMPLE IV 100 parts by weight of the same 1-2 mm coal grains as used in Example III are, while in the fluidized state, heated in air for 16 hours at a temperature of about 300° C.

Subsequently, 100 parts by weight of sublimed sulphur are added and the mixture thus obtained is heated for 4 hours at 300° C. Finally, the resulting grains are heated for another 5 hours at 90° C. with an aqueous solution of 10% by weight NaOH and 10% by weight $Na_2S$. Next, as in Example III, the grains are successively washed with water, excess acid and water.

The results are given in Example IX.

EXAMPLE V 100 parts by weight of asphalt are heated, with stirring, with 100 parts by weight of sulphur. At a temperature of 200° C. hydrogen sulfide escapes. Upon continued heating to 260° C., the viscosity of the mass increases. After 4 hours the mass is left to cool down and then crushed into grains measuring 0.5 to 1.5 mm. Subsequently, 100 parts by weight of the sulphurized material are treated for 16 hours at 100° C. with 200 parts by weight of 96% by weight $H_2SO_4$. After the material has been cooled and the concentrated $H_2SO_4$ has been centrifuged off, it is washed with water until acid free and is treated with an aqueous NaOH/$Na_2S$ solution in the way indicated in Example IV.

Upon analysis it is found that this material contains strongly acid groups in an amount of as little as 50 meg/1. About 25 ml of grains are introduced into a 20 cm column and are found capable of sorbing all silver from a fixing bath containing 1 g silver per liter.

EXAMPLE VI

To illustrate the strong metal adsorbing capacity of the material prepared by the process of the invention the product prepared in Example I A is tested for its capacity of retaining mercury from a solution containing $HgCl_4^{2-}$ ions.

Through a column of the product prepared in Example I A 20 cm in bed weight and having a bed volume of 25 ml there is passed an aqueous solution containing 100 mg $Hg^{2+}$ and 10 grams of NaCl per liter. Over a period of 80 hours 10 liters of 400 bed volumes of this solution are passed through the column. Next, it is found upon analysis by flame spectrometry that the effluent contains only as little as about 1 ppb (part per billion) of mercury. Comparative experiments in which brown coal briquettes (particle size 0.5 to 1.5 mm) are treated with an aqueous solution of NaOH and of coal grains also treated with such a solution and fluidized in air ("Oxycoal") yield weakly acid cation exchangers having a reasonable exchange capacity. These materials, however, are not capable of adsorbing mercury from solution containing a $HgCl_4^{2-}$ ions.

This capacity is not obtained until the material has been sulphurized.

EXAMPLE VII

The product prepared in Example I B is introduced into a 20 cm column, as used in Example VI. Through the column there is passed a sulphuric acid solution (pH=1) containing chromium in the form of $CrO_4^{2-}$ and in an amount of 35 mg/1. After the passage of 20 liters or 800 bed volumes the yellow solution is still found to get entirely discolored.

EXAMPLE VIII 25 ml of granular material prepared in the way described in Example II are introduced into a 20 cm column, as used in Example VI. Through the column there is passed a solution of 1 mg $Cu^{2+}$ per liter in 25% by weight sulphuric acid. After passage of 40 bed volumes over a period of 8 hours no copper can be found in the effluent of the column.

The solution is subsequently replaced by a 5% sulphuric acid solution containing about 100 mg Ag per liter.

Here too, after 1 liter has passed over a period of 8 hours, no silver can be detected in the effluent of the column. Finally, the silver solution is replaced by a sulphuric acid gold solution (about 100 mg $Au^{3+}$ per liter). After 1 liter of this solution has passed through over a period of 8 hours, the metal ions are found to be completely adsorbed. The sorptions were attended with reduction of the metal ions.

EXAMPLE IX

The products prepared in Examples I A, I B, II, III, IV and V are tested for their capacity of sorbing $Hg^{2+}$ from a solution which contains 2 grams of mercury in the form of $HgCl_4^{2-}$ per liter of an aqueous solution of 30 grams of NaCl per liter. The percentages dry content listed in the table below are determind in the $H^+$ form. The capacities are determined by passing the sublimate solution through a 20 cm column packed with 25 ml of adsorbing material.

Loading is not terminated until the mercury leakage is more than 50%.

Table

| Materials used in the examples | Mercury ads. capacity in g/l | Dry content (%) in $H^+$ form |
|---|---|---|
| I A | 50 | 60 |
| I B | 45 | 64 |
| II | 90 | 56 |
| III | 15 | 85 |
| IV | 65 | 69 |
| V | 40 | 70 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a solid carbon-containing material having a sorption capacity for metal ions which comprises mixing a carbon-containing starting material with sulphur, heating the resulting mixture at a temperature in the range of about 120° to 500° C. and subsequently heating the resulting product and an aqueous solution containing an alkali metal hydroxide at a temperature of up to about 200° C.

2. The process of claim 1, wherein said aqueous solution contains a dissolved alkali metal sulphide.

3. The process of claim 1 where prior to or subsequent to the said first heating at about 120° to 500° C., the starting material is reacted with sulphuric acid or oleum or is heated in the presence of air or some other oxygen-containing gas.

4. The process of claim 1, wherein the amount of sulphur is from about 0.5 to about 1.5 parts by weight based on the weight of carbon containing material.

5. The process of claim 1, wherein the alkali metal hydroxide is potassium hydroxide or sodium hydroxide.

6. The process of claim 4, wherein the carbon containing material is rubber.

* * * * *